United States Patent [19]

Hung et al.

[11] Patent Number: 5,310,838
[45] Date of Patent: May 10, 1994

[54] FUNCTIONAL FLUOROPOLYMERS

[75] Inventors: Ming-Hong Hung; Paul R. Resnick, both of Wilmington, Del.

[73] Assignee: E. I. Du Pont de Nemours and Company, Wilmington, Del.

[21] Appl. No.: 115,060

[22] Filed: Sep. 7, 1993

[51] Int. Cl.$^5$ .............................................. C08F 18/20
[52] U.S. Cl. .................................. 526/245; 526/246; 526/247; 526/249; 526/255
[58] Field of Search ............... 526/246, 247, 249, 255, 526/245

[56] References Cited

U.S. PATENT DOCUMENTS 5,080,508  1/1992  Onishi et al. ..................... 526/247

FOREIGN PATENT DOCUMENTS 0303292  2/1989  European Pat. Off. ............ 526/247

Primary Examiner—Joseph L. Schofer
Assistant Examiner—N. Sarofim
Attorney, Agent, or Firm—Edwin Tocker

[57] ABSTRACT

Repeat units having pendant functional groups increase the solubility of polymers containing repeat units of perfluoro-2,2-dimethyl-1,3-dioxole.

8 Claims, No Drawings

FUNCTIONAL FLUOROPOLYMERS

FIELD OF THE INVENTION

This invention is in the field of fluoropolymers, and in particular pertains to substantially non-elastomeric fluoropolymers containing monomer units that introduce pendant functional groups into the polymer.

BACKGROUND OF THE INVENTION

There are numerous well-known fluoropolymers in the class generally regarded as fluoroplastics, including both partially crystalline and amorphous fluoropolymers. Commonly, these polymers are stable at high temperature and resistant to chemical attack, with the degree of stability and inertness increasing with fluorine content in the molecule. While the chemical properties of known fluoropolymers are highly desirable for many purposes, their inertness also has the effect of making it difficult to produce solutions of the fluoropolymers or to bond other materials to them. When the polymer contains only perfluorinated monomers, the resultant perfluoropolymer is most difficult to put into solution.

Resnick in U.S. Pat. No. 3,978,030 describes certain polymers of perfluoro-2,2-dimethyl-1,3-dioxole (PDD), including both homopolymers of PDD, which are not further characterized, and a crystalline copolymer of tetrafluoroethylene (TFE), which has a melting point $T_m$ of about 265° C. Since Resnick's discovery of PDD homopolymer, it has been established that the material is amorphous and has a very high glass transition temperature $T_g$ of about 335° C. The homopolymer is brittle and difficult to fabricate into final products because of poor melt flow and low solubility in available solvents.

Squire in U.S. Pat. No. 4,530,569 describes amorphous dipolymers of PDD with TFE as well as terpolymers of PDD with TFE and another comonomer. In U.S. Pat. Nos. 4,935,477 and 4,754,009, Squire describes dipolymers and terpolymers (collectively, copolymers) of PDD with comonomers which include certain perfluoroolefins and perfluoro(alkyl vinyl) ethers. It is shown in these patents that, in general, the $T_g$ of those copolymers decreases with increasing comonomer content, although not necessarily in a linear fashion. For a dipolymer containing 10 mol % of TFE, $T_g$ is decreased to about 260° C. Generally, if the PDD content of those copolymers is less than about 12 mol %, those copolymers have some crystallinity. While the amorphous copolymers are soluble at room temperature in perfluoro(2butyl tetrahydrofuran), their solubility is not high. For example, a dipolymer with 10 mol % of TFE has a solubility of less than 3 wt % in this solvent. This imposes some restrictions on fabrication techniques that require application of copolymer from solution, such as dip-coating or spray-coating.

U.S. Pat. No. 4,897,457 to Nakamura et al. describes homopolymers and copolymers containing 6-membered and 5-membered rings derived from the monomer $CF_2=CF-OCF_2CF_2CF=CF_2$, perfluoro(butenyl vinyl ether) (PBVE) which forms the cyclic structure(s) during polymerization. For the amorphous homopolymer, $T_g$ is only about 108° C. Comonomers disclosed have the effect of reducing $T_g$. Moreover, it is stated that copolymers with fluorinated olefins and vinyl ethers lose transparency, solvent-solubility, and mechanical strength if repeat units derived from PBVE constitute less than 80 wt % of the polymer.

Hung in U.S. Pat. Nos. 4,982,009 and 5,059,720 discloses hydroxy-containing fluorovinyl ethers and polymers containing units derived from those ether monomers. Among those hydroxy-containing fluorovinyl ethers, a preferred monomer is $CF_2=CFO-CF_2CF(CF_3)O-CF_2CF_2-CH_2OH$ (EVE-OH).

SUMMARY OF THE INVENTION

This invention provides functional polymers having increased solubility, comprising repeat units of perfluoro-2,2-dimethyl-1,3-dioxole and the repeat unit

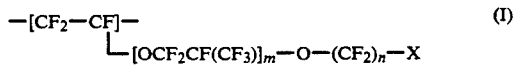

wherein X is $(CH_2)_p-O-COR$             (II)

or

COOR                                (III)

and m=0–20, n=1–10, p=1–4, and R is alkyl having 1–6 carbon atoms or phenyl.

The functional repeat unit (I) with X=(II) can be derived from monomer compounds of the formula

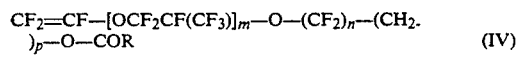

which are also provided by this invention.

It is preferred that m=0–5, n=1–4, p=1–2, and R is alkyl.

It is most preferred that m=0–3, p=1, and R is methyl or ethyl.

DETAILED DESCRIPTION

In one embodiment, the polymers of this invention contain units derived from functional fluorovinyl ethers having the general formula

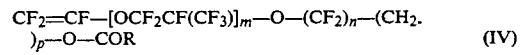

wherein m=0–20, n=1–10, p=1–4, and R is alkyl having 1–6 carbon atoms or phenyl. These monomers can be derived from hydroxy-functional fluorovinyl ethers disclosed in U.S. Pat. No. 4,982,009 and having the general formula

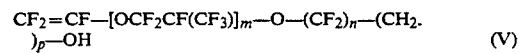

wherein m, n, and p are as defined above. The hydroxy compound (V) can be converted to the ester compound (IV) by reaction with pyridine, N,N-dimethylaminopyridine, and acetyl chloride in methylene chloride. This reaction can be conducted in glassware, for example, at atmospheric pressure and at cool temperatures such as 0°–25° C., preferably 5°–15° C. The product (IV) can be isolated from the reaction mass by conventional means.

In another embodiment of the invention, the polymers of this invention contain units derived from functional fluorovinyl ether monomers having the general formula

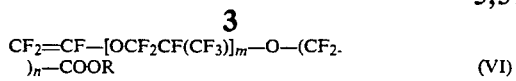
(VI)

but which may require post-polymerization esterification because of partial hydrolysis of —COOR during aqueous polymerization. The esterification can be carried out by treatment of the polymer, for example, with trimethyl orthoformate.

The concentration of repeat units (I) in the polymer is about 0.1–10 mol %, preferably 0.5–5 mol %.

The polymer of this invention is a generally random copolymer comprising repeat units of PDD and repeat units (I). While the polymer of this invention can consist essentially of repeat units of PDD and repeat units (I), the polymer can contain units from one or more other fluoromonomers that will copolymerize with PDD, (IV) and (VI). Other fluoromonomers that can be used include but are not limited to TFE, hexafluoropropylene, chlorotrifluoroethylene (CTFE), vinylidene fluoride, PBVE, and perfluoro(alkyl vinyl) ether (PAVE) having the formula $CF_2=CFO(CF_2CFXO)_nR_f$ wherein X is F or $CF_3$, n is 0–5, and $R_f$ is a perfluoroalkyl group of 1–6 carbon atoms. When other fluoromonomers are used, the ratio of repeat units of PDD to repeat units of other fluoromonomers is desirably at least about 12/88 on a molar basis. Since $T_g$ of the polymer increases with PDD content, it is often advantageous to have higher ratios of repeat units of PDD to repeat units of other fluoromonomers, such as at least about 65/35 or 70/30 or 80/20 or even 90/10. Preferred other fluoromonomers are TFE, CTFE, PBVE and PAVE with n=0 in the formula above. TFE is especially preferred either alone or in combination with other fluoromonomers, and is most preferred alone.

Polymers of this invention are of such molecular weight that the inherent viscosity measured in perfluoro(2-butyl tetrahydrofuran) (Fluorinert® FC-75, 3M Company) at 25° C. will be at least about 0.3 and can range up to about 2.5. A preferred range is 0.4–2.0 for inherent viscosity.

The polymer of this invention, containing repeat units (I), exhibits increased solubility over polymer otherwise similar but lacking repeat units (I). Surprisingly, small concentrations, or small differences in concentration, of these repeat units make large differences in solubility of the polymer. Increased solubility enhances utility in fabrication techniques such as dip-coating or spray-coating. For example, a solution of higher concentration would yield a thicker coating in a single dip.

EXAMPLE 1

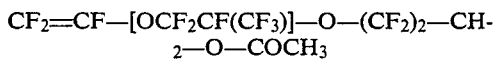

In a round bottom flask, 354.6 g (0.9 mole) of $CF_2=CF-[OCF_2CF(CF_3)]-O-(CF_2)_2-CH_2-OH$ (EVE—OH), prepared according to U.S. Pat. No. 4,982,009, were dissolved in 900 ml of methylene chloride maintained at 5°–10° C. Temperature was controlled by adjusting the depth to which the flask was immersed in an ice-water bath. First pyridine (71.2 g, 0.9 mole) and then N,N-dimethylaminepyridine (22 g, 0.18 mole) were added sequentially and slowly with stirring while the flask contents were kept at a temperature below 10° C. Then acetyl chloride (94.2 g, 1.2 mole) was added slowly while the temperature of the reaction mixture was kept below 15° C. After the addition was complete, the reaction mass was warmed to ambient temperature and dumped into a mixture of ice-water (750 ml) and 6N HCl (750 ml). After stirring, the bottom organic layer was separated with a separatory funnel, washed sequentially with dilute HCl and then water, and dried over magnesium sulfate. After methylene chloride was removed with vacuum, the residue was distilled to yield 275 g (70% yield) of product $CF_2=CF-[OCF_2CF(CF_3)]-O-(CF_2)_2-CH_2-O-COCH_3$ (methyl 2,2-dihydroperfluoro-[5,8-dioxa-6-methyl-9-nonenoate], herein called EVE-OAc) that boiled at 104° C. at a pressure of 60 mmHg. Proton and $^{19}F$ NMR analyses confirmed the structure of EVE-OAc. Elemental analysis further supports the identification of the product as EVE-OAc, as shown in Table 1.

TABLE 1

| Composition of EVE-OAc | | |
|---|---|---|
| | Element Fraction (wt %) | |
| Element | Theoretical | Measured |
| C | 27.52 | 27.69 |
| H | 1.16 | 1.18 |
| F | 56.65 | 56.54 |

EXAMPLE 2

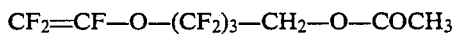

Using the flask and temperature control method of Example 1, 27.8 g (0.1 mole) of 7,7-dihydro-7-hydroxy-perfluoro-(3-oxa-heptene) prepared according to U.S. Pat. No. 4,982,009, were dissolved in 100 ml of methylene chloride at 5°–10° C. To this solution, pyridine (7.91 g, 0.1 mole) and N,N-dimethylaminepyridine (2.44 g, 0.02 mole) were added in the order named, followed by acetyl chloride (10.45 g, 0.133 mole) while the reaction mass temperature was kept below 15° C. After addition was complete, the reaction mixture was warmed to room temperature and was worked up as in Example 1. After distillation, 20 g 62.5% yield) of product $CF_2=CF-O-(CF_2)_3-CH_2-O-COCH_3$ (methyl 2,2-dihydro-perfluoro-[6-oxa-7-heptenoate]) were obtained as a clear liquid that boiled at 82° C. at a pressure of 50 mmHg. Proton and $^{19}F$ NMR analyses confirmed the named structure.

EXAMPLE 3

Non-Aqueous Polymerization of PDD/TFE/EVE-OAc

A shaker tube was charged with 185 g of 1,1,2-trichloro-1,2,2-trifluoroethane (CFC-113), 10 g (0.023 mole) of EVE-OAc, 50 g (0.205 mole) of perfluoro-2,2-dimethyl-1,3-dioxole (PDD), 1 g of TFE, and 0.1 g of 4,4'-bis(t-butylcyclohexyl)peroxy dicarbonate initiator. The tube was sealed, cooled, and evacuated. Then, 1 g of TFE was charged to the tube. The tube was sealed again and heated to reaction temperature with shaking. Polymerization was carried out for 3 hr at 50° C. followed by 5 hr at 60° C. After venting the tube, a polymer solution was discharged and CFC-113 was evaporated. The residue was washed with water and dried in a vacuum (150 mmHg) oven at 100° C. for 24 hr to yield 43.7 g of polymer. This polymer had $T_g$ of 238° C. by DSC. No. crystalline melting point was detected. Inherent viscosity was 1.26 measured in FC-75 at 25° C.

EXAMPLES 4–5

Two additional PDD/TFE/EVE-OAc polymers were prepared by the general procedure of Example 3 except that monomer quantities were changed to obtain different polymer compositions. Polymerization temperatures were in the range of 50°–70° C. The molar compositions of the polymers were PDD/TFE/EVE-OAc=67.6/30/2.4 (Example 4) and 78.4/20.5/1.1 (Example 5) by $^{19}F$ NMR at high temperature. The Example 4 polymer had $T_g=147°$ C. and inherent viscosity of 0.55, while the Example 5 polymer had $T_g=177°$ C. and inherent viscosity of 1.66.

EXAMPLE 6

Aqueous Polymerization of PDD/TFE/EVE-OAc

A 2-liter horizontal stirred reactor was charged with 1250 ml of demineralized water, 50 ml of CFC-113, 4.0 g of the ammonium salt of perfluorononanoic carboxylic acid (Surflon® S111, Asahi Glass), 55 g (0.126 mole) of EVE-OAc, and 50 ml of 4% aqueous solution of ammonium persulfate. The reactor was purged with nitrogen, and then 10 g (0.1 mole) of TFE and 48 g (0.197 mole) of PDD were charged. The reactor was heated to 60° C. and the agitator speed was adjusted to 175 rpm. When the temperature stabilized at 60° C., simultaneous TFE feed and PDD feed were started at the rates of 14 g/hr and 86.4 g/hr, respectively. Monomer feeding was continued for 3 hr. After stopping monomer feeds, the reactor was vented and a milky dispersion was discharged. The dispersion was coagulated by vigorous stirring, washed with water, and dried to yield 359.9 g of white polymer powder. $T_g$ for this polymer was 136° C. as determined by DSC. No crystalline melting point was detected. The molar composition of the polymer was PDD/TFE/EVE-OAc=68.9/27.1/4.0 by $^{19}F$ NMR at high temperature. Inherent viscosity was 0.84 in FC-75 at 25° C.

EXAMPLE 7

Solubility Testing

The polymers of Examples 3–6 were tested for solubility in CFC-113 and FC-75 at room temperature. Control polymers A and B tested for comparison were PDD/TFE dipolymers prepared generally as described by Squire in U.S. Pat. No. 4,530,569. Solubility data are summarized in Table 2, in which solubilities are expressed as % wt/wt, meaning weight of polymer as per cent of solvent weight. The data show the benefit to solubility of repeat units of formula (I) when X has formula (II).

TABLE 2

Solubilities for Examples 3–6 and Controls

| Sample | Composition (mol %) PDD/TFE/EVE-OAc | $T_g$(°C.) | Solubility (% wt/wt) CFC-113 | FC-75 |
|---|---|---|---|---|
| A | 95/5/0 | 230–240 | 0 | 2 |
| B | 65/35/0 | 150–160 | 0 | 10 |
| Ex. 3 | — | 238 | 0 | 2–4 |
| Ex. 4 | 67.6/30/2.4 | 147 | 13 | >10 |
| Ex. 5 | 78.4/20.5/1.1 | 177 | 1 | 8–9 |
| Ex. 6 | 68.9/27.1/4.0 | 136 | >15 | >15 |

EXAMPLE 8

PDD/TFE/EVE Polymer

In the 2-liter reactor of Example 5, a mixture of 1350 ml of demineralized water, 4 g of ammonium perfluorononanoate, 4.8 ml of CFC-113, 3.2 ml of CF$_2$=CFO—CF$_2$CF(CF$_3$)O—CF$_2$CF$_2$—COOCH$_3$ (EVE, prepared according to U.S. Pat. No. 4,138,426), 11.1 g of TFE, 26 ml of PDD, and 4 g of ammonium persulfate heated to 60° C. and stirred until the pressure dropped by 5 psi. Then, 60 g of TFE, 16.8 ml of EVE, 25.2 ml of CFC-113, and 140.8 ml of PDD were added in 3 hr. The resulting polymer latex was discharged from the reactor, and was coagulated by the addition of 25 ml of concentrated nitric acid followed by addition of CFC-113 and stirring. The polymer was washed with water, heated to 55° C. for one hour, filtered, and dried to give 316.5 g of white polymer with a $T_g$ of 125° C. by DSC. No crystalline melting was detected. An infrared spectrum of a film pressed from the polymer showed the presence of bands due to —COOCH$_3$ (1796 cm−1) and —COOH (1775 cm−1). The spectrum was consistent with a terpolymer of PDD, TFE, and EVE in which some of the ester group had hydrolyzed to carboxylic acid.

A portion of the above polymer was refluxed for 66 hr with trimethyl orthoformate, filtered, and dried in a vacuum oven at 135° C. for 30 min. An infrared spectrum of a film pressed from the treated polymer showed only the ester band at 1796 cm−1. The acid band at 1775 cm−1 was gone. The solubility of the polymer in FC-75 at room temperature rose from 1–3% before trimethyl orthoformate treatment to almost 8% after this treatment, showing the benefit to solubility of repeat units of formula (I) when X has formula (III). Solubilities in this example are expressed as weight of polymer as per cent of solution weight.

What is claimed is:

1. Fluoropolymer comprising repeat units of perfluoro-2,2-dimethyl-1,3-dioxole and the repeat unit

wherein X is (CH$_2$)$_p$—O—COR or COOR and m=0–20, n=1–10, p=1–4, and R is alkyl having 1–6 carbon atoms or phenyl.

2. The fluoropolymer of claim 1 wherein m=-5, n=1–4, p=1–2, and R is alkyl.

3. The fluoropolymer of claim 2 wherein m=0–3, p=1, and R is methyl or ethyl.

4. The fluoropolymer of claim 2 wherein the concentration of

is about 0.1–10 mol %.

5. The fluoropolymer of claim 1 wherein the concentration is 0.5–5 mol %.

6. The fluoropolymer of claim 1 further comprising repeat units of at least one additional fluoromonomer.

7. The fluoropolymer of claim 6 wherein an additional fluoromonomer is selected from tetrafluoroethylene, chlorotrifluoroethylene, perfluoro(butenyl vinyl ether), and perfluoro(alkyl vinyl) ether.

8. The fluoropolymer of claim 7 wherein an additional fluoromonomer is tetrafluoroethylene.

* * * * *

UNITED STATES PATENT AND TRADEMARK OFFICE
CERTIFICATE OF CORRECTION

PATENT NO. : 5,310,838
DATED : May 10, 1994
INVENTOR(S) : Hung, et. al.

It is certified that error appears in the above-indentified patent and that said Letters Patent is hereby corrected as shown below:

Column 6, claim 1, line 44, change "m=-5" to --m=0-5 --.

Column 6, claim 4, line 48, change "2" to -- 1 --.

Signed and Sealed this

Thirtieth Day of August, 1994

Attest:

BRUCE LEHMAN

Attesting Officer

Commissioner of Patents and Trademarks